United States Patent [19]

van der Merwe

[11] 4,347,880
[45] Sep. 7, 1982

[54] TREE TRIMMERS

[76] Inventor: Jacobus C. van der Merwe, 144 Kerk St., Nylstroom, Transvaal, South Africa

[21] Appl. No.: 216,782

[22] Filed: Dec. 15, 1980

[30] Foreign Application Priority Data

Nov. 28, 1979 [ZA] South Africa ............. 79/6454

[51] Int. Cl.³ .................. B26B 15/00; B27L 1/00
[52] U.S. Cl. ....................... 144/2 Z; 30/228; 30/296 R
[58] Field of Search .............. 30/296, 228, 246; 144/2 Z

[56] References Cited
U.S. PATENT DOCUMENTS
3,721,004 3/1973 Buckles.

FOREIGN PATENT DOCUMENTS
437897 11/1967 Switzerland ................. 30/246
1377386 12/1974 United Kingdom ......... 30/296 R Primary Examiner—W. D. Bray
Attorney, Agent, or Firm—Fleit & Jacobson

[57] ABSTRACT

A tree trimmer has a pruning head adapted to be operated by a reciprocable rod to perform a cutting action and to open up. A double acting compressed air operated linear thrustor causes an actuating rod to reciprocate. A standpipe, which is composed of a series of tubes detachably and rigidly screwed together, is interposed between a casing of the thrustor and the pruning head. A solid plug is formed at one end of each tube with a guide hole. A series of connecting rods detachably and rigidly screwed together pass through the guide holes. The series of connecting rods are connected at one end to the actuating rod and at the other end to the reciprocable rod.

3 Claims, 2 Drawing Figures

U.S. Patent  Sep. 7, 1982  4,347,880
FIG_1
FIG_2
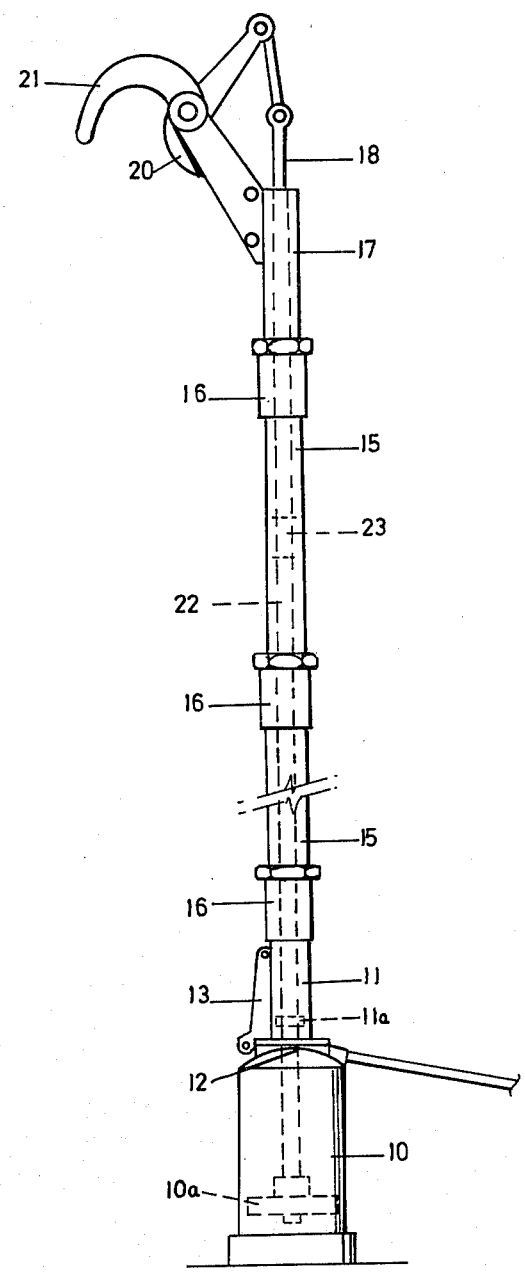
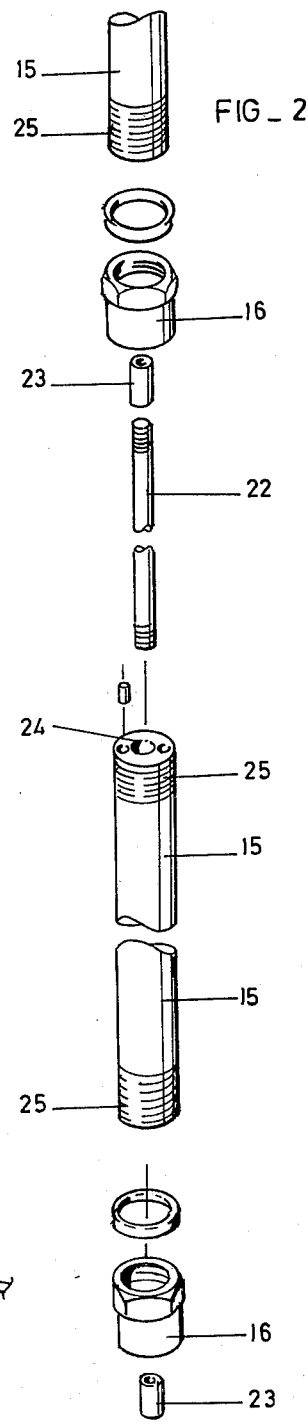

TREE TRIMMERS

BACKGROUND OF THE INVENTION

This invention relates to tree trimmers.

In timber plantations it is necessary to trim the trees periodically by removing the lower branches to stimulate upward growth and growth of the main stem. Conventionally all kinds of manual tools are used by labourers to effect the trimming operation. Such work is dangerous and time consuming.

An object of the invention is to provide a mechanically operated device which can be operated with a reasonable degree of safety to effect tree trimming operations.

SUMMARY OF THE INVENTION

A tree trimmer according to the invention comprises a pruning head adapted to be operated by a reciprocable rod, a double acting compressed air operated linear thrustor having a casing and an acutating rod, and a series of detachable extension pieces comprising a series of detachable tubes adapted to be interposed between the casing and the pruning head and a series of connecting rods adapted to be detachably and rigidly secured together along the standpipe formed by extension pieces which are in use, the series of connecting rods being connected at one end to the actuator rod and at the other end to the reciprocable rod. Thus by actuating the thrustor, the pruning head is caused to operate.

DESCRIPTION OF THE DRAWINGS

FIG. 1 is a view of a tree trimmer according to the invention, and

FIG. 2 is an exploded view of two fragments of extension pieces.

DESCRIPTION OF A PREFERRED EMBODIMENT

The illustrated tree trimmer has a thrustor composed of a large cylinder 10 and a smaller cylinder 11. Inside the cylinders is a common thrust rod carrying two pistons 10a and 11a. A valve 12 controls admission of air to the cylinders. When air is admitted to the large cylinder, the large piston moves down. When the valve is released, the large cylinder is exhausted and compressed air is admitted to the small cylinder to cause the small piston to move up. An operating lever 13 actuates the valve 12. All of this is part of a known structure used on pruning shears.

Surmounting the cylinder 11 are a series of tubes 15 connected together by means of couplings 16. On top of the topmost coupling 16 there is a pruning head 17 of known construction, but sufficiently large and robust for tree trimming. Collectively the tubes 15 constitute a standpipe for supporting the pruning head.

The pruning head 17 is operated by means of a reciprocable rod 18 which operates a cutting knife 20 operating against a hooked anvil 21.

The thrust rod and the reciprocable rod 18 are connected together by means of a series of rods 22 joined together by coupling sleeves 23 (FIG. 2). Each tube 15 at one end has a solid plug 25 which has a guide hole 24 for a rod 22.

In use the trimmer is assembled with as many tubes 15 and rods 22 as are required to reach the required trimming height. In a practical device as much as 10 meters have been reached with ten tubes 15 of 900 mm length.

I claim:

1. A tree trimmer comprising:
   a pruning head adapted to be operated by a reciprocable rod to perform a cutting action and to open up;
   a double acting compressed air operated linear thrustor having a casing and an actuating rod which is caused to reciprocate;
   a standpipe composed of a series of tubes detachably and rigidly screwed together and interposed between the casing and the pruning head; each tube being formed at one end as a solid plug having a guide hole therein; and
   a series of connecting rods passing through the guide holes and detachably and rigidly screwed together, the series of connecting rods being connected at one end to the actuating rod and at the other end to the reciprocable rod.

2. A tree trimmer as claimed in claim 1 wherein the thrustor is composed of a large cylinder and a smaller cylinder with a common thrust rod carrying two pistons inside the cylinders; and having a valve to control admission of air to the cylinders and an operating lever to actuate the valve.

3. A tree trimmer as claimed in claim 1 or claim 2 wherein the rods are joined together by coupling sleeves to provide an operating rod of variable length.

* * * * *